(12) United States Patent
Cui et al.

(10) Patent No.: US 11,159,448 B2
(45) Date of Patent: *Oct. 26, 2021

(54) DYNAMICALLY MODIFYING SERVICE DELIVERY PARAMETERS

(71) Applicant: AT&T Intellectual Property I, L.P., Atlanta, GA (US)

(72) Inventors: Zhi Cui, Sugar Hill, GA (US); Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/592,424

(22) Filed: Oct. 3, 2019

(65) Prior Publication Data

US 2020/0036652 A1    Jan. 30, 2020

Related U.S. Application Data

(63) Continuation of application No. 15/444,382, filed on Feb. 28, 2017, now Pat. No. 10,439,958.

(51) Int. Cl.
*H04L 12/927* (2013.01)
*H04L 12/26* (2006.01)
*H04L 12/24* (2006.01)
*H04L 29/08* (2006.01)

(52) U.S. Cl.
CPC ............ *H04L 47/805* (2013.01); *H04L 41/00* (2013.01); *H04L 41/5045* (2013.01); *H04L 43/04* (2013.01); *H04L 67/12* (2013.01)

(58) Field of Classification Search
CPC ..................................................... H04L 47/805
See application file for complete search history.

(56) References Cited

U.S. PATENT DOCUMENTS

| | | | |
|---|---|---|---|
| 9,444,842 B2 | 9/2016 | Porras et al. | |
| 9,450,823 B2 | 9/2016 | Arora et al. | |
| 9,515,873 B2 | 12/2016 | Anumala | |
| 9,571,384 B2 | 2/2017 | Wu et al. | |
| 10,439,958 B2 * | 10/2019 | Cui ........................ | H04L 47/805 |
| 2003/0223431 A1 | 12/2003 | Chavez et al. | |
| 2013/0010798 A1 | 1/2013 | Shaffer et al. | |
| 2015/0139238 A1 | 5/2015 | Pourzandi et al. | |
| 2015/0154258 A1 | 6/2015 | Xiong et al. | |

(Continued)

FOREIGN PATENT DOCUMENTS

WO    WO2015142372 A1    9/2015

*Primary Examiner* — Jason E Mattis

(57) ABSTRACT

In one example, the present disclosure describes a device, computer-readable medium, and method for dynamically modifying parameters for the delivery of data services over a network. For instance, in one example, a plurality of network slices is provided in a communications network. Each network slice of the plurality of network slices is configured to carry data over the communications network subject to a different combination of network service metrics. When a triggering event is detected in data carried over the communications network using a default slice of the plurality of network slices, the data is dynamically reassigned from the default network slice to a new network slice of the plurality of network slices in response to the detecting.

20 Claims, 3 Drawing Sheets

(56) References Cited

U.S. PATENT DOCUMENTS

| | | |
|---|---|---|
| 2015/0312808 A1* | 10/2015 | Kiss .................... H04W 48/14 370/331 |
| 2015/0365288 A1 | 12/2015 | Van Der Merwe et al. |
| 2015/0373735 A1 | 12/2015 | Thubert et al. |
| 2016/0063189 A1 | 3/2016 | Soon-Shiong et al. |
| 2016/0218974 A1 | 7/2016 | Kotha et al. |
| 2016/0337164 A1 | 11/2016 | Klaedtke et al. |
| 2016/0352645 A1 | 12/2016 | Senarath et al. |
| 2016/0353367 A1 | 12/2016 | Vrzic et al. |
| 2017/0054595 A1 | 2/2017 | Zhang et al. |
| 2017/0332212 A1 | 11/2017 | Gage |
| 2017/0332421 A1 | 11/2017 | Sternberg et al. |
| 2018/0054765 A1 | 2/2018 | Kim et al. |
| 2018/0182199 A1 | 6/2018 | Yamine |
| 2018/0242198 A1* | 8/2018 | Choi .................... H04W 28/18 |

* cited by examiner

DYNAMICALLY MODIFYING SERVICE DELIVERY PARAMETERS

This application is a continuation of U.S. patent application Ser. No. 15/444,382, filed Feb. 28, 2017, now U.S. Pat. No. 10,439,958, which is herein incorporated by reference in its entirety.

The present disclosure relates generally to software defined networking, and relates more particularly to devices, non-transitory computer-readable media, and methods for dynamically modifying parameters for the delivery of data services over a network.

BACKGROUND

A service level agreement (SLA) is a contract that defines the parameters (e.g., quality, availability, etc.) under which a service provider provides services to a customer. For instance, a service provider that provides data services over a communications network may carry data over the network according to a defined level of service. The defined level of service may set goals for network service metrics such as mean time between failures, mean time to repair, and/or mean time repair, data rate, data throughput, jitter, delay, bandwidth, or the like.

SUMMARY

In one example, the present disclosure describes a device, computer-readable medium, and method for dynamically modifying parameters for the delivery of data services over a network. For instance, in one example, a plurality of network slices is provided in a communications network. Each network slice of the plurality of network slices is configured to carry data over the communications network subject to a different combination of network service metrics. When a triggering event is detected in data carried over the communications network using a default slice of the plurality of network slices, the data is dynamically reassigned from the default network slice to a new network slice of the plurality of network slices in response to the detecting.

In another example, a device includes a processor and a computer-readable medium storing instructions which, when executed by the processor, cause the processor to perform operations. The operations include providing a plurality of network slices in a communications network, wherein each network slice of the plurality of network slices is configured to carry data over the communications network subject to a different combination of network service metrics, detecting a triggering event in data carried over the communications network using a default slice of the plurality of network slices, and dynamically reassigning the data from the default network slice to a new network slice of the plurality of network slices in response to the detecting.

In another example an apparatus includes an input device and a processor. The input device is configured to receive user data carried over a communications network using a default network slice of the communications network, wherein the default network slice is one of a plurality of network slices of the communications network, and wherein each network slice of the plurality of network slices is configured to carry data over the communications network subject to a different combination of network service metrics. The processor is configured to detect a triggering event in the user data and to dynamically reassign the user data from the default network slice to a new network slice of the plurality of network slices in response to the triggering event.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a means for dynamically modifying parameters for the delivery of data services over a network. As discussed above, a provider of data services may carry data for a customer over a communications network according to a defined level of service (e.g., as defined in a service level agreement, or SLA). However, there may be times at which a greater level of service than that defined by the SLA is useful. For instance, if the data being carried over the network is medical data (e.g., readings from a sensor that monitors a customer's health), a greater level of service may allow the customer and/or healthcare provider to exchange critical information in a more timely and/or reliable manner.

Examples of the present disclosure define "slices" in a communications network, where a slice of the network is a combination of network functions and/or services that may be instantiated for services and applications supported by the network. For instance, a particular slice of the network may be configured to carry data over the network subject to a specific combination of network service metrics (e.g., mean time between failures, mean time to repair, and/or mean time repair, data rate, data throughput, jitter, delay, bandwidth and/or any other metrics that affect the speed or quality of data delivery). According to this model, particular types of data (e.g., medical data) may be carried over an assigned default slice. However, upon detection of a triggering event, the data may be dynamically reassigned to an upgraded slice providing some improved combination of network functions and/or services. The reassignment may be temporary, e.g., as long as is necessary to resolve the triggering event. In a further example, billing may also be dynamically adjusted to account for any financial charges associated with the reassignment. Although examples of the present disclosure are discussed within the context of electronic health data delivery, it will be understood that the present disclosure is applicable to any type of service or application that is provided over a communications network.

Figure 1:
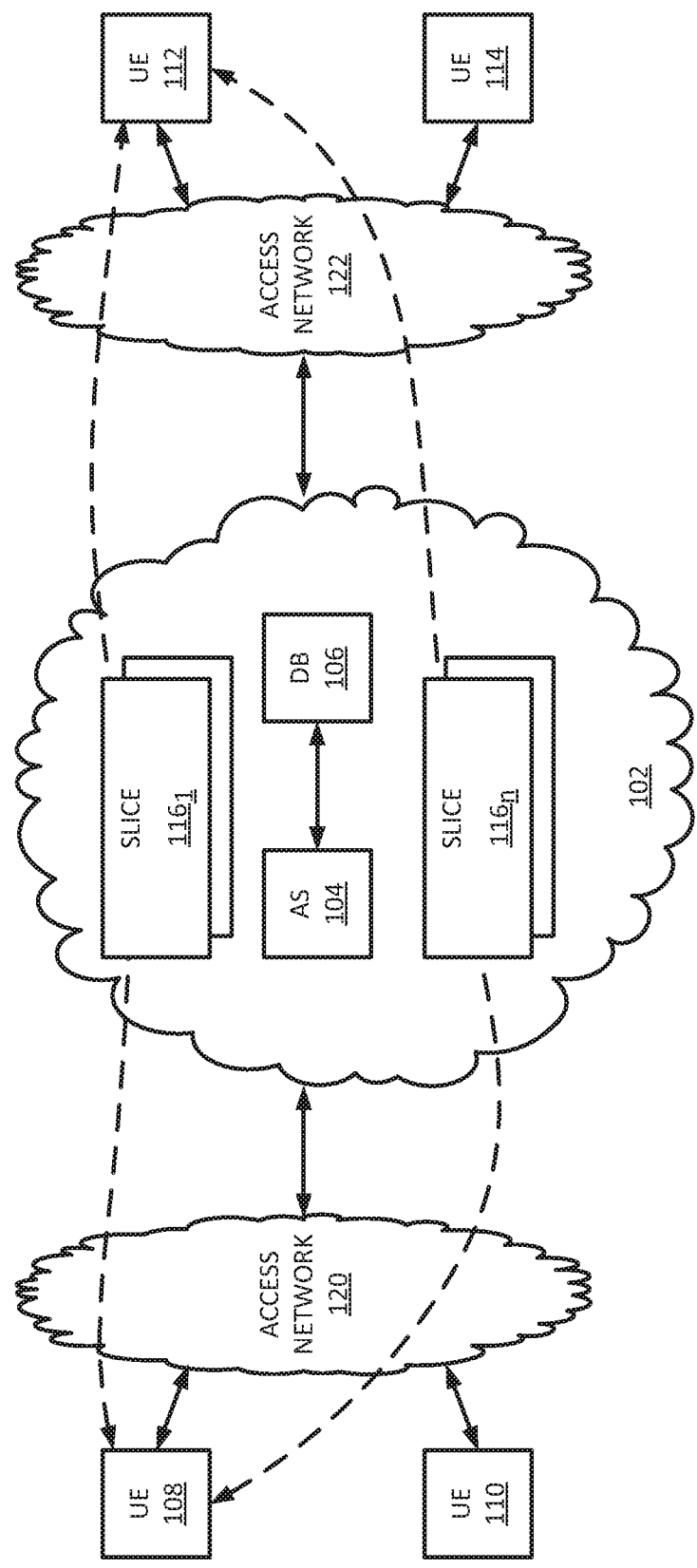
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single AS 104 and a single DB 106 are illustrated, it should be noted that any number of application servers 104 or databases 106 may be deployed. Furthermore, for ease of illustration, various additional elements of core network 102 are omitted from FIG. 1.

Figure 3:
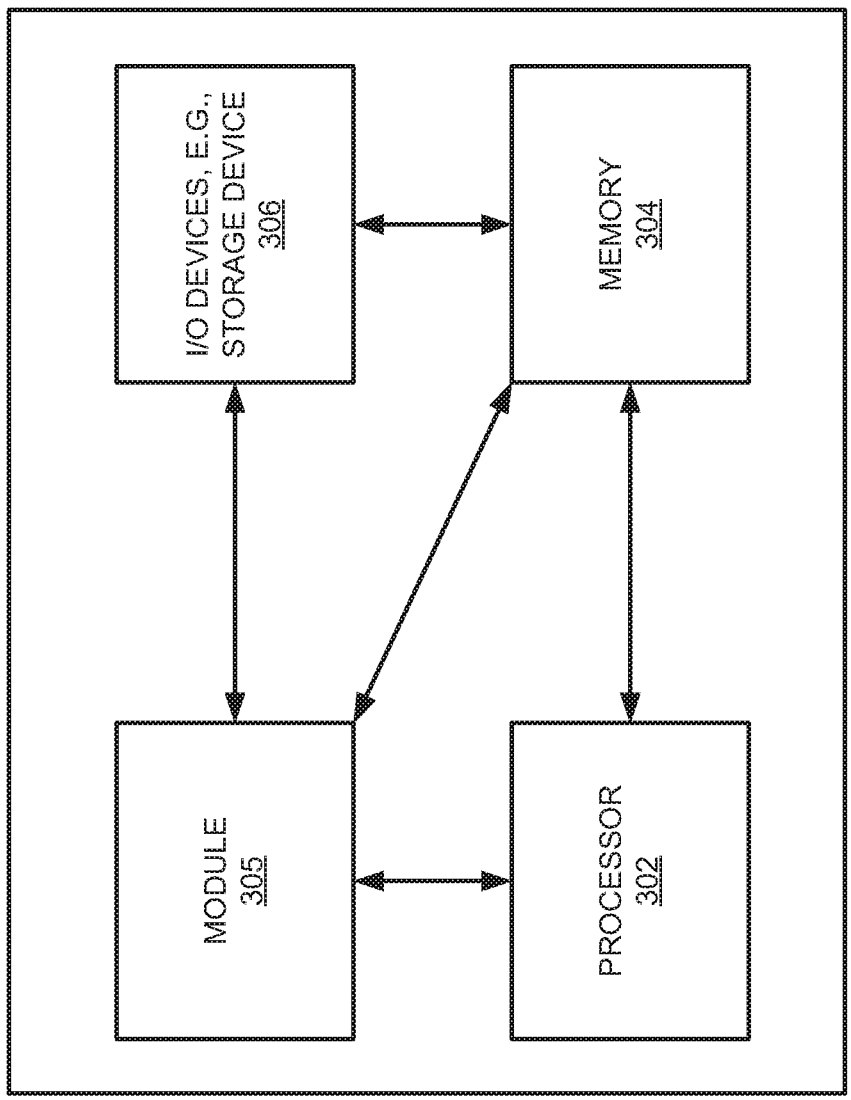
FIG. 3 depicts a high-level block diagram of a computing device specifically programmed to perform the functions described herein.

In one embodiment, the AS 104 may comprise a general purpose computer as illustrated in FIG. 3 and discussed below. In one embodiment, the AS 104 may perform the methods discussed below related to dynamically modifying parameters for the delivery of data services over a network 100. For instance, in one example, the AS 104 supports a software-defined networking (SDN) architecture. The AS 104 may be further configured to provide particular data and services to customers. For instance, in one example, the AS 104 is configured to provide electronic health data to customers, where the customers may include healthcare providers and their patients.

In one embodiment, the DB 106 may store data relating to the data and services supported by the AS 104. For example, where the AS 104 is configured to provide electronic health data to customers, the DB 106 may store user profiles, which can be dynamically updated with health data provided via one or more user endpoint devices 108, 110, 112, or 114. For instance, the health data could include sensor readings relating to heart rate, blood glucose levels, weight, blood pressure, or other health-related metrics. The user profiles may also include target ranges for these health-related metrics. Other health-related data, including healthcare provider and health insurance provider and coverage information, could also be included in the user profiles. Further examples of the user profiles may include contact information (address, telephone number, email address), identifying information (e.g., name or patient identifier), and/or demographic information (e.g., age, gender, nationality, etc.) for the users. In further examples, the user profiles may include billing information associated with the users (e.g., default network slice and billing rate, network slice upgrade history, contact information, etc.). User profiles may be stored in encrypted form to protect user privacy.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114. Access networks 120 and 122 may transmit and receive communications between respective UEs 108, 110, 112, and 124 and core network 102 relating to communications with web servers, AS 104, and/or other servers via the Internet and/or other networks, and so forth.

In one embodiment, the user endpoint devices 108, 110, 112, and 114 may be any type of subscriber/customer endpoint device configured for wired or wireless communication such as a desktop computer, a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, and the like. In one example, any one or more of the user endpoint devices 108, 110, 112, and 114 may have both cellular and non-cellular access capabilities and may further have wired communication and networking capabilities. In the example where the AS 104 is configured to provide electronic health data to customers, the user endpoint devices 108, 110, 112, and 114 may include user endpoint devices operated by healthcare providers and their patients. It should be noted that although only four user endpoint devices are illustrated in FIG. 1, any number of user endpoint devices may be deployed.

As illustrated in FIG. 1, the network 100 may be divided into a plurality of "slices" $116_1$-$116_n$ (hereinafter collectively referred to as "slices 116"), where each slice is characterized by a combination of network functions and/or services that may be instantiated for services and applications supported by the network 100. For instance, each slice 116 of the network 100 may be characterized by different combinations of network service metrics, such as different delay and bandwidth metrics. Thus, each network slice 116 may be associated with its own SLA and performance guarantee, which may differ from the SLAs and performance guarantees associated with other network slices. According to this model, particular types of data (e.g., medical data, financial data, etc.) may be carried over an assigned default slice 116. However, upon detection of a triggering event, the data may be dynamically reassigned to an upgraded slice 116 providing some improved combination of network functions and/or services as discussed in greater detail below. Different slices 116 may be defined for different types of data or services (e.g., healthcare services, navigation services, emergency services, etc.). Moreover, new slices 116 can be instantiated or duplicated dynamically.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, any one or more of the user endpoint devices 108, 110, 112, and 114 may host an operating system for presenting a user interface that may be used to send data to the AS 104 (e.g., updates to user profiles/preferences, sensor readings, etc.) and for reviewing data sent by the AS 104 (e.g., alerts, recommendations, etc.).

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
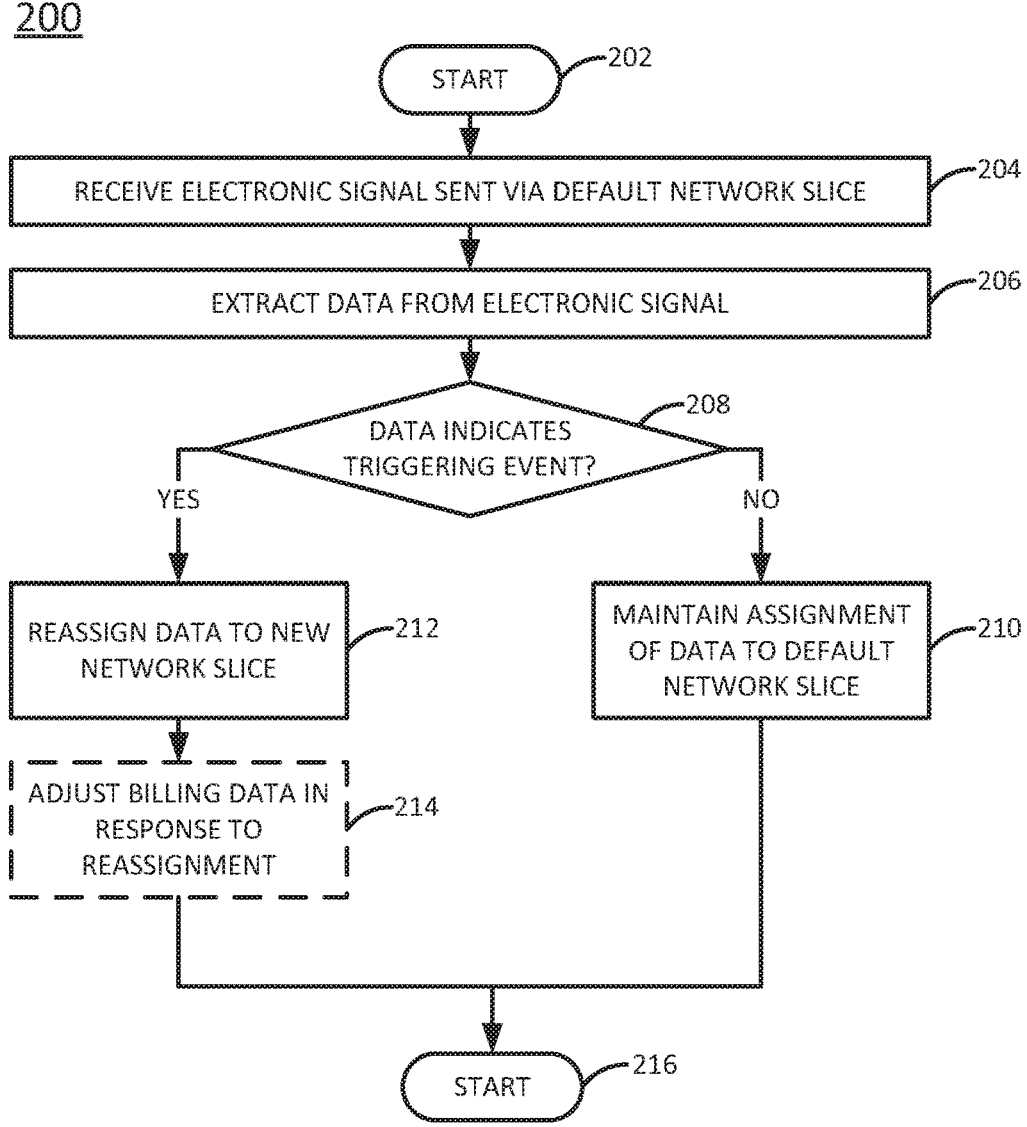
FIG. 2 illustrates a flowchart of a first example method for dynamically modifying parameters for the delivery of data services over a network.

To further aid in understanding the present disclosure, FIG. 2 illustrates a flowchart of a first example method 200 for dynamically modifying parameters for the delivery of data services over a network. In one example, the method 200 may be performed by an application server such as the AS 104 illustrated in FIG. 1. However, in other examples, the method 200 may be performed by another device. As such, any references in the discussion of the method 200 to the AS 104 of FIG. 1 are not intended to limit the means by which the method 200 may be performed.

The method 200 begins in step 202. In step 204, AS 104 receives an electronic signal sent by a user endpoint device via a default network slice associated with data sent to and from the user endpoint device. The user endpoint device may be one of the UEs 108, 110, 112, or 114 of FIG. 1. For instance, the user endpoint device could be operated by a healthcare patient or a healthcare provider. In one example, the electronic signal is a signal sent from one user endpoint device to another, which the AS 104 may intercept or act as a relay for. In another example, the electronic signal is a signal sent by the user endpoint device directly 10 the AS 104.

In step 206, the AS 104 extracts data from the electronic signal. For instance, if the electronic signal comprises a plurality of data packets, the AS 104 may extract data from the individual packets and then reassemble the extracted data to produce a message. The message may contain text data, video data, audio data, sensor readings, or other types of data. For instance, in the context of healthcare, the message may contain sensor readings from a device that monitors some aspect of a patient's health (e.g., heart rate, blood glucose level, weight, blood pressure, etc.). In another example, the message may contain a request from a patient or from a healthcare provider.

In step 208, the AS 104 determines whether the data indicates a triggering event requiring a reassignment of the network slice 116 to which data sent to and from the user endpoint device is assigned. For instance, the data may contain a message from a patient or from a healthcare provider requesting an upgrade or a downgrade of the network slice. In another example, the data may contain an indication of a potential health-related anomaly, such as a sensor reading whose value falls outside of some predefined range (e.g., a reading from a heart monitor indicating a heart rate that is higher or lower than a threshold). In this case, the AS 104 may employ conditional rules that allow it to determine when a triggering event has occurred. In some cases, the AS 104 may learn what events constitute triggering events through observation of user patterns and may update these conditional rules based on learned data. The AS 104 may also employ rules that allow it to compare data from different sources (e.g., the network layer, the service layer, etc.) in order to determine which network slice will provide the best performance at a given time.

If the AS 104 concludes in step 208 that no triggering event is detected, then the AS 104 proceeds to step 210 and maintains the assignment of the data sent to and from the user endpoint device with the default network slice.

If, however, the AS 104 concludes in step 208 that a triggering event has been detected, then the AS 104 proceeds to step 212. In step 212, the AS 104 reassigns the data sent to and from the user endpoint device to a new network slice. The new network slice may provide service that is an upgrade or a downgrade from the service provided by the default slice. For instance, if the triggering event is a reading from a heart monitor indicating a patient heart rate in excess of some upper threshold, then the new network slice may provide lower delay and/or higher bandwidth than the default slice. This upgraded performance may allow the patient's user endpoint device to send more detailed data, such as real-time video data, to a user endpoint device operated by the patient's healthcare provider.

In one example, the AS 104 automatically reassigns the network slice upon detecting a triggering event. However, in another example, the AS 104 may send a query to the user of at least one user endpoint device (e.g., a patient or a healthcare provider) or to another party (e.g., a healthcare insurance provider) to request permission to provide the reassignment. For instance, where the reassignment may result in a change to the way one or more users is billed for the data services, the one or more users may request that any reassignments of the network slice be approved before they can be carried out.

In optional step 214 (illustrated in phantom), the AS 104 adjusts billing data for the delivery of the data services in response to the reassignment of the network slice. For instance, if the reassignment of the network slice resulted in an upgrade to the services provided to one or more users, the AS 104 may make a corresponding adjustment to the users' billing rates for at least the period of time during which the reassignment was effective.

The method 200 ends in step 216.

Thus, in the healthcare context, examples of the present disclosure may be used to facilitate electronic health monitoring and remote diagnoses. The ability to dynamically upgrade the service via which electronic health data is carried over a network enables more timely and proactive responses to potential medical emergencies. However, by limiting provision of the upgraded service to the times when it is most needed (e.g., when a triggering condition is detected), and maintaining a default level of service at other times, the costs incurred by users can be minimized.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, an application server (such as might be used to perform the method 200) could be implemented as illustrated in FIG. 3.

As depicted in FIG. 3, the system 300 comprises a hardware processor element 302, a memory 304, a module 305 for dynamically modifying parameters for the delivery of data services, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for dynamically modifying parameters for the delivery of data services may include circuitry and/or logic for performing special purpose functions relating to the monitoring, reporting, and providing feedback relating to a user's eating habits. The input/output devices 306 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a neurotransmitter, an output port, and a user input device (such as a keyboard, a keypad, a mouse, and the like), a health-related sensor (e.g., a glucose monitor, a heart rate monitor, a blood pressure monitor, or a blood alcohol monitor), or another type of sensor.

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for dynamically modifying parameters for the delivery of data services (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for dynamically modifying parameters for the delivery of data services (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
providing a plurality of network slices in a communications network, wherein each network slice of the plurality of network slices is configured to carry data over the communications network subject to a different combination of network service metrics;
extracting a message from a plurality of packets sent by a user endpoint device using a default network slice of the plurality of network slices to which packets sent by the user endpoint device is assigned;
detecting a triggering event in the message that is extracted from the plurality of packets;
obtaining, from the user endpoint device, in response to the detecting the triggering event, a permission to reassign the user data plurality of packets from the default network slice to a new network slice of the plurality of network slices; and dynamically reassigning the plurality of packets from the default network slice to the new network slice in response to the obtaining the permission.

2. The method of claim 1, wherein each network slice of the plurality of network slices is instantiated for a different service supported by the communications network.

3. The method of claim 1, wherein the triggering event comprises a request from a user to reassign the plurality of packets from the default network slice to the new network slice.

4. The method of claim 1, wherein the message contains medical data of a user.

5. The method of claim 1, wherein the message contains medical data, and a user of the user endpoint device is a healthcare provider caring for an individual associated with the medical data.

6. The method of claim 1, wherein the message contains medical data, and a user of the user endpoint device is a healthcare insurance provider providing healthcare insurance to an individual associated with the medical data.

7. The method of claim 1, further comprising:
adjusting a billing rate associated with the plurality of packets in response to the dynamically reassigning.

8. The method of claim 1, wherein the dynamically reassigning results in a temporary reassignment of the plurality of packets to the new network slice.

9. The method of claim 1, wherein the new network slice provides an upgraded service relative to the default network slice.

10. The method of claim 1, wherein the new network slice provides a downgraded service relative to the default network slice.

11. A device, comprising:
a processor; and
a computer-readable medium storing instructions which, when executed by the processor, cause the processor to perform operations, the operations comprising:
providing a plurality of network slices in a communications network, wherein each network slice of the plurality of network slices is configured to carry data over the communications network subject to a different combination of network service metrics;
extracting a message from a plurality of packets sent by a user endpoint device using a default network slice of the plurality of network slices to which packets sent by the user endpoint device is assigned;
detecting a triggering event in the message that is extracted from the plurality of packets;
obtaining, from the user endpoint device, in response to the detecting the triggering event, a permission to reassign the plurality of packets from the default network slice to a new network slice of the plurality of network slices; and
dynamically reassigning the plurality of packets from the default network slice to the new network slice in response to the obtaining the permission.

12. The device of claim 11, wherein the triggering event comprises a request from a user to reassign the plurality of packets from the default network slice to the new network slice.

13. The device of claim 11, wherein the operations further comprise:
adjusting a billing rate associated with the plurality of packets in response to the dynamically reassigning.

14. The device of claim 11, wherein the dynamically reassigning results in a temporary reassignment of the plurality of packets to the new network slice.

15. An apparatus, comprising:
an input device to receive a plurality of packets sent by a user endpoint device over a communications network using a default network slice of the communications network, wherein the default network slice is one of a plurality of network slices of the communications network, and wherein each network slice of the plurality of network slices is configured to carry data over the communications network subject to a different combination of network service metrics; and
a processor to extract a message from the plurality of packets, to detect a triggering event in the message that is extracted from the plurality of packets, to obtain, from the user endpoint device, in response to the detecting the triggering event, a permission to reassign the plurality of packets from the default network slice to a new network slice of the plurality of network slices, and to dynamically reassign the plurality of packets from the default network slice to the new network slice in response to the obtaining the permission.

16. The apparatus of claim 15, wherein the processor is further to adjust a billing rate associated with the plurality of packets in response to the dynamically reassigning.

17. The apparatus of claim 15, wherein the dynamically reassigning results in a temporary reassignment of the plurality of packets to the new network slice.

18. The apparatus of claim 15, wherein the new network slice provides an upgraded service relative to the default network slice.

19. The apparatus of claim 15, wherein the new network slice provides a downgraded service relative to the default network slice.

20. The apparatus of claim 15, wherein the message contains medical data of a user.

* * * * *